United States Patent Office 3,618,466
Patented Nov. 9, 1971

3,618,466
DEVICE FOR ELIMINATING FLASH FROM WELD SEAMS OF BUTT-JOINTED STRIPS IN A BUTT WELDER
Jury Mikhailovich Nedodaev, Rogozhskyval 15, kv. 23; Boris Adolfovich Ryss, M. Kolkhoznaya ploschad 1, kv. 138; and Samuil Grigorievich Molchadsky, N. Cheremushkinskaya ulitsa 50, korpus 1, kv. 23, all of Moscow, U.S.S.R.
Filed Mar. 16, 1970, Ser. No. 19,843
Int. Cl. B23d 1/14
U.S. Cl. 90—24 F                                    3 Claims

ABSTRACT OF THE DISCLOSURE

A device for eliminating flash from the weld seams of metal strips in a butt welding machine, wherein provision is made for pivotable levers mounted on a common pivot pin and adapted to conjointly turn in a vertical plane, the vacant ends of said levers carrying cutting tools arranged one above the other, the strip being cleaned passing therebetween; and supporting rollers mounted on both sides of the cutting tools and adapted to be in constant contact with the surface of the strip under treatment, the line of contact of said rollers lying on the same straight line as the cutting edge of the tool.

The present invention relates generally to devices for removing flash from the transverse weld seams of butt-jointed metal strips and more specifically to devices for removing flash from the weld seams of metal strips jointed in butt-welding machines.

The present invention can find maximum utility when employed for jointing strips of great width (1000 mm. and over) by using butt welders installed in continuous process lines featuring frequently changed types and sizes of the strips to be weld-jointed such as continuous pickling units in cold-rolling shops.

Known in the present state of the rolling practice are cutter-type flash removing devices located outside the welder or such devices built-in thereinto.

When using separate or detached devices much time is wasted for mutual positioning of the welder and the strips to be jointed, as well as for moving said strips with respect to the welder. Moreover, when employing said devices the weld seam turns cold to the moment when flash is being removed, this resulting in higher cutting force and, consequently, in a premature wear of the cutters.

The above disadvantageous effects may be eliminated by the provision of flash-removing devices built into welders and comprising two vertically pivotable levers mounted on a slide block by way of independent pivot pins, said levers carrying at their vacant ends the cutting tools adapted to simultaneously remove flash on both sides of the weld seam, which levers are associated with a mechanical actuator for said levers to bring together while removing flash and to bring apart after flash has been removed, said cutting tools being arranged one above another and adjusted for a definite strictly preset strip thickness whereas said mechanical actuator for positively bringing said levers together or apart is stationary (cf., e.g., the welding machine, Model BGF 22/80 available from the Belgian firm "Electromécanique Bruxelles").

In said devices the adjustment of the cutting tools for a definite and exactly preset strip thickness involves a great many setup operations when passing from one size or type of strips to another so as to suit each particular size or type being treated. Moreover, provision of the independent pivot pins of the levers and a stationary mechanical actuator of said levers fails to effect a quality flash removal from the weld seam of a strip having an irregularly shaped cross-sectional area (such as lenticular or wedge-shaped strips).

Furthermore, said cutter-carrying levers fail to be imparted sufficient rigidity, this being due to the fact that they are to be introduced into a die opening which depends upon the adopted welding technique. Thus, when the thrust arising during flash removal is varied, this results in an inadequately cleaned strip as to its width which is especially liable to occur when cleaning large-width strips.

It is therefore an essential object of the present invention to provide a device for eliminating flash from the weld seams of metal strips that would possess such a construction of the levers thereof that would be instrumental in attaining a quality flash removal from a strip without involving any further adjustment of the cutting tools for any size and type of the strip and any shape of the profile thereof, and that said device would be capable of a quality flash removal from large-width strips.

Said object is accomplished due to the fact in a device for flash removal from the weld seams of metal strips, comprising two vertically pivotable levers mounted on a slide block and carrying at their vacant ends cutting tools arranged one above the other to remove flash simultaneously on both sides of the weld seam, said levers being associated with a mechanical actuator for their being positively brought together while removing flash and brought apart after flash has been removed, according to the invention said levers are so interconnected that they are free to jointly turn in a vertical plane, whereas each of the levers carries supporting rollers located on both saides of the cutting tool, the lines of contact of said rollers with the surface of the strip under treatment lying on a straight line common to the cutting edge of the tool. Such a design enables the cutting tools to be self-adjusted for a required strip size irrespective of the type thereof, makes it possible for the tools to closely contact the surface of the strip due to a floating construction of the levers, as well as to effect quality cleaning of a strip possessing an irregularly shaped cross-sectional area.

It is expedient that said levers be mounted on the slide block on a common pivot pin, whereas the mechanical actuators for their being brought together or apart are favourable to be made as a hydraulic power cylinder whose barrel is pivotally mounted on one of the levers and the rod, on the other lever. Such a design ensures a joint turning of both levers in a vertical plane.

To promote understanding the invention will now be described in detail through a consideration of an exemplary embodiment thereof with due reference to the accompanying drawings, wherein.

Figure 1:
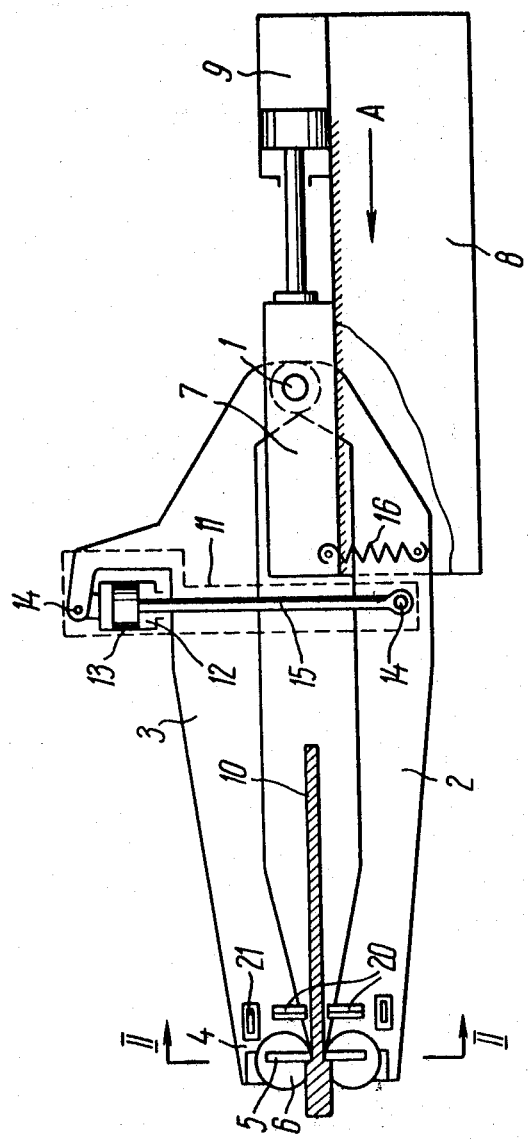
FIG. 1 is a schematic diagram of a device, according to the invention.

Now referring to FIG. 1 the device for eliminating flash from the weld seams of metal strips comprises two vertically pivotable levers 2 and 3 mounted on a common pivot pin 1, vacant ends 4 of said levers carrying cutting tools 5 arranged one above the other, and supporting rollers 6 located on both sides of said cutting tools.

The pivot pin 1 is fixed in a slide block 7 which is mounted on a frame 8 and imparted motion from a hydraulic actuator (cylinder) 9.

The levers 2 and 3 are interlinked so as to be vertically pivotable at a time, their conjoint turn being necessary at an incorrect position of a strip 10 being cleaned with respect to the cutting tools 5.

Said levers are coupled to a mechanical actuator 11 for their being positively brought together while removing flash and brought apart after flash has been removed, said mechanical actuator being made essentially as a hydraulic power cylinder 12 whose barrel 13 is pivotally mounted to the lever 3 by means of a hinge joint 14 and a rod 15, on the lever 2. Such a constructional feature of the mechanical actuator 11 enables the levers 2 and 3 to be brought together while removing flash and brought apart after flash has been removed, as well as to conjointly turn in a vertical plane.

The total weight of the levers 2 and 3 is counterbalanced by a spring 16 whose one end is fixed to the slide block 7 and the other, to the lever 2. The spring is to set the initial position of the ends 4 of the levers 2 and 3 together with the cutting tools 5 relative to the surface of the strip 10.

Figure 2:
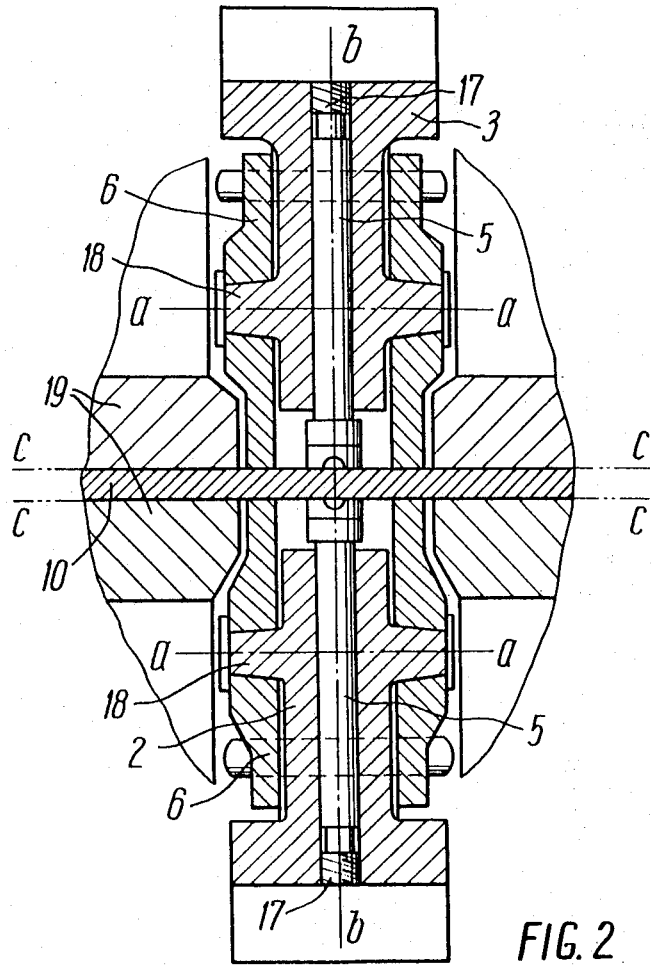
FIG. 2 is a section along the line II—II of FIG. 1.

Vertical borings 17 (FIG. 2) are made in the vacant ends 4 of the levers 2 and 3 for the cutting tools to insert. Located on both sides of said borings are journals 18 on which supporting rollers 6 rotate and whose horizontal axes $a$—$a$ are perpendicular to the longitudinal axis $b$—$b$ of the borings 17. Such a design is adapted in order that the line of contact $c$—$c$ of each pair of the supporting rollers 6 with the surface of the strip 10 coincides and lies on a straight line common to the cutting edge of the tools 5 as it can be seen from FIG. 2.

Besides, the cutting tools 5 are movable in the borings 17 for their being preadjusted with respect to the supporting rollers 6.

A constant contact of the rollers 6 with the strip 10 clamped between dies 19 of the welding machine provides for the tools 5 to closely contact the strip surface irrespective of the shape of the cross-sectional area thereof, of the thickness and parallelism of the guideways of the frame 8 along which the slide block 7 travels, as well as of the locating surfaces of the dies 19.

To clean the dies 19 from metal particles stuck thereto during welding, provision is made for scrapers 20 (FIG. 1) mounted at the vacant ends 4 of the levers 2 and 3.

To preclude transverse displacement of the ends 4 of the levers 2 and 3 along with the cutting tools 5, said levers carry rollers 21 featuring vertical axis of rotation. The device of the present disclosure operates as follows.

Preparatory to flash removal the levers 2 and 3 (FIG. 1) together with the cutting tools are to be balanced by means of the spring 16, brought apart by means of the hydraulic actuator (cylinder) 12 and caused to slide off the welding machine, the slide block 7 being at the time in its extreme right-hand position.

The welding process over, the dies 19 (FIG. 2) are moved such a distance apart as to make it possible for the levers 2 and 3 to pass therebetween, while the strips to be welded together are so positioned (by means of a special device not shown in the drawings) that the weld seam is disposed amid the above distance. Simultaneously, the hydraulic actuator (cylinder) 12 urges the levers 2 and 3 towards each other until the rollers 6 rest against each other exerting a force 20 to 30 percent higher than the thrust arising during flash removal from the strip 10.

Thereupon the slide block 7 is actuated by the hydraulic cylinder 9 to travel in the direction shown by the arrow A, while the levers 2 and 3 together with the cutting tools 5 are introduced into the gap in between the dies 19. While so doing the supporting rollers 6 run onto the strip 10 and ride thereover thus following its shape, whereas the cutting tools 5 are brought apart for a distance corresponding to the thickness of the strip 10 thus removing flash on both sides of the weld seam at a time. Since the force with which the levers 2 and 3 are urged towards each other is in excess of the effective thrust, the rollers 6 will always be forced against the strip 10, thereby ensuring that the levers 2 and 3 are self-adjusted and the cutting tools 5 are in close contact with the strip irrespective of its cross-sectional shape, type and size.

Simultaneously with flash removal the scrapers 20 clean the dies 19 and the rollers 21 keep the ends 4 of the levers 2 and 3 against being transversely displaced with respect to the dies 19.

Flash-removing procedure over, the levers 2 and 3 complete with the cutting tools 5 are brought apart by means of the hydraulic actuator (cylinder) 9, the dies 19 release the strip 10 to discharge it from the welding machine and the slide block 7 returns in its extreme right-hand position.

Then the entire working procedure is recycled.

We claim:

1. A device for eliminating flash from the weld seams of metal strips in butt welding machines, comprising: a frame and a slide block mounted on said frame; two levers mounted on said slide block and so interlinked as to be free to conjointly turn in a vertical plane; cutting tools for flash to simultaneously remove on both sides of a weld seam, said tools being fixed at the vacant ends of said levers and arranged one above the other; supporting rollers mounted on each of said levers on both sides of said cutting tool and adapted to be in contact with the surface of the strip being treated so that the line of contact of each roller lies on the same straight line as the cutting edge of said tool; and a mechanical actuator for said levers to positively bring together while flash removing and bring apart after flash has been removed, said actuator being mounted on said levers.

2. A device as claimed in claim 1, wherein for the levers to conjointly turn in a vertical plane these are mounted on a common pivot pin which is fixed on the slide block, whereas the mechanical actuator for said levers to positively bring together or apart, is made as a hydraulic cylinder whose barrel is articulated to one of said levers and the rod of said cylinder, to the other lever.

3. A device as claimed in claim 1, wherein each of the vacant ends of the levers is provided with a vertical boring for the cutting tool to insert, whereas located on both sides of said boring are journals, whereon supporting rollers are free to rotate, the horizontal axes of said rollers being perpendicular to the longitudinal axis of said boring.

References Cited

UNITED STATES PATENTS

| | | | |
|---|---|---|---|
| 1,832,719 | 11/1931 | McBerty | 90—24 F |
| 2,327,407 | 8/1943 | Edyvean | 90—24 F |
| 2,592,640 | 4/1952 | Bailis | 90—24 F |
| 3,198,081 | 8/1965 | Seeloff et al. | 90—24 F |

FOREIGN PATENTS

| | | | |
|---|---|---|---|
| 992,789 | 5/1965 | Great Britain | 90—24 F |

ANDREW R. JUHASZ, Primary Examiner

Z. R. BILINSKY, Assistant Examiner